(12) United States Patent
Shacklette et al.

(10) Patent No.: US 9,136,544 B2
(45) Date of Patent: Sep. 15, 2015

(54) DUAL LAYER SOLID STATE BATTERIES

(75) Inventors: Lawrence W. Shacklette, Melbourne, FL (US); Louis J. Rendek, Jr., West Melbourne, FL (US)

(73) Assignee: Harris Corporation, Melbourne, FL (US)

(*) Notice: Subject to any disclaimer, the term of this patent is extended or adjusted under 35 U.S.C. 154(b) by 1008 days.

(21) Appl. No.: 12/721,960

(22) Filed: Mar. 11, 2010

(65) Prior Publication Data
US 2011/0223467 A1 Sep. 15, 2011

(51) Int. Cl.
| | |
|---|---|
| *H01M 2/24* | (2006.01) |
| *H01M 6/42* | (2006.01) |
| *H01M 6/00* | (2006.01) |
| *H01M 4/82* | (2006.01) |
| *H01M 10/14* | (2006.01) |
| *B23P 19/00* | (2006.01) |
| *H01M 6/40* | (2006.01) |

(Continued)

(52) U.S. Cl.
CPC ........... *H01M 6/40* (2013.01); *H01M 2/204* (2013.01); *H01M 6/48* (2013.01); *H01M 10/044* (2013.01); *H01M 10/058* (2013.01); *H01M 2/1066* (2013.01); *H01M 10/0525* (2013.01); *H01M 10/0562* (2013.01); *H01M 2004/025* (2013.01); *Y10T 29/49115* (2015.01)

(58) Field of Classification Search
CPC ............ H01M 10/0525; H01M 10/0562; H01M 2004/025
USPC ......... 429/149, 160, 231.95; 29/623.1, 623.2, 29/623.3, 730
See application file for complete search history.

(56) References Cited

U.S. PATENT DOCUMENTS 5,633,097 A * 5/1997 Miller ............................ 429/94
6,197,450 B1 3/2001 Nathan et al.
(Continued)

FOREIGN PATENT DOCUMENTS

JP H08-508604 9/1996
JP H08-508604 * 9/1997 .............. H01M 6/10
(Continued)

OTHER PUBLICATIONS

Real Dictionary, Princeton University (C) 2001, Princeton New Jersey, taken as Dec. 2001 and applicable to access per May 26, 2003, {http://www.realdictionary.com/}.*
(Continued)

*Primary Examiner* — Patrick Ryan
*Assistant Examiner* — Aaron Greso
(74) *Attorney, Agent, or Firm* — Robert J. Sacco, Esq.; Fox Rothschild LLP

(57) ABSTRACT

Methods for fabrication of electronic systems and systems therefrom are provided. An electronic system includes a first substrate (202) having a first surface (202a) and a second substrate (208) having a second surface (208a) facing the first surface. The system also includes a plurality of battery cell layers (106-112) disposed on a plurality of laterally spaced areas on the first and second surfaces (203, 209). In the system, portions of the battery cell layers on the first surface are in physical contact with portions of the battery cell layers on the second surface and the battery cell layers on the first surface and the second surface form a plurality of electrically interconnected battery cells (206, 212) on the first and the second surfaces that are laterally spaced apart and that define one or more batteries (200).

7 Claims, 10 Drawing Sheets

(51) Int. Cl.
  *H01M 2/20* (2006.01)
  *H01M 6/48* (2006.01)
  *H01M 10/04* (2006.01)
  *H01M 10/058* (2010.01)
  *H01M 2/10* (2006.01)
  *H01M 10/0525* (2010.01)
  *H01M 10/0562* (2010.01)
  *H01M 4/02* (2006.01)

(56) References Cited

U.S. PATENT DOCUMENTS

| | | | |
|---|---|---|---|
| 6,610,440 | B1 | 8/2003 | LaFollette et al. |
| 6,962,613 | B2 | 11/2005 | Jenson |
| 2002/0001746 | A1* | 1/2002 | Jenson .......................... 429/162 |
| 2003/0152815 | A1 | 8/2003 | LaFollette et al. |
| 2004/0191626 | A1 | 9/2004 | Lewis, Jr. et al. |
| 2005/0079418 | A1* | 4/2005 | Kelley et al. ............. 429/231.95 |
| 2008/0003492 | A1* | 1/2008 | Bates ............................. 429/66 |
| 2009/0136839 | A1* | 5/2009 | Kraznov et al. ............... 429/160 |

FOREIGN PATENT DOCUMENTS

| | | | | |
|---|---|---|---|---|
| JP | 2003257473 | A | 9/2003 | |
| JP | 2007-103129 | * | 4/2007 | ............ H01M 10/38 |
| WO | WO-2009054632 | A2 | 4/2009 | |
| WO | WO 2009/108185 | * | 9/2009 | ............ H01M 10/40 |

OTHER PUBLICATIONS

Webster's New World Dictionary of the American Language, 2nd College Edition, New York 1972 p. 734 and p. 1512.*

Balkansi, M., "Solid-state microbatteries for electronics in the 21st centry", Solar Energy Materials and Solar Cells, Elsevier Science Publishers, Amsterdam, NL, vol. 62, No. 1-2, Apr. 1, 2000, pp. 21-35.

International Search Report mailed Aug. 25, 2011, Application Serial No. PCT/US2011/026795 in the name of Harris Corporation.

Office Action dated Aug. 30, 2013, issued in Korean Patent Application No. 10-2012-7026207.

* cited by examiner

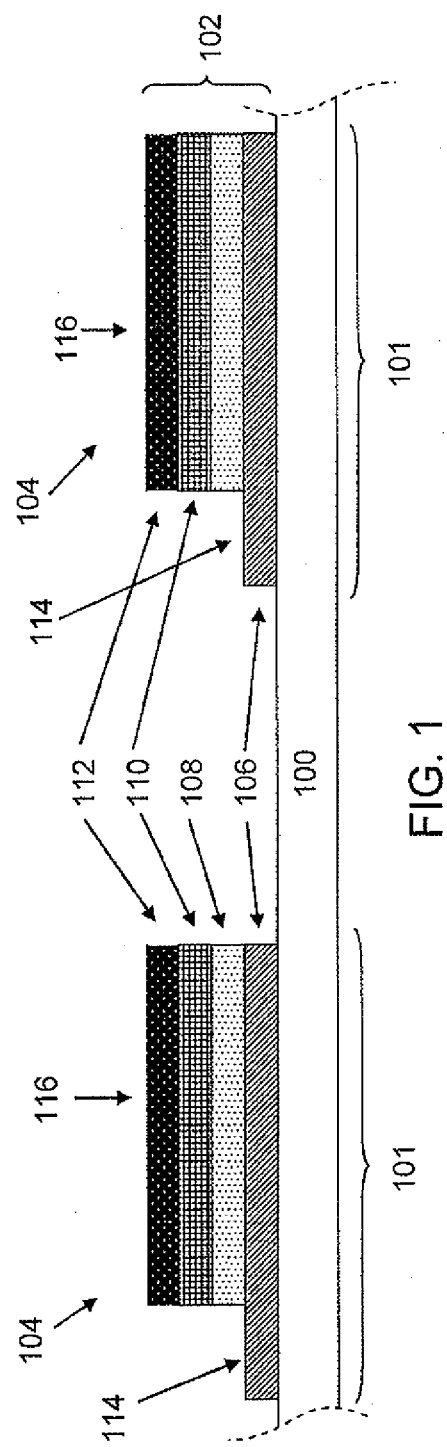

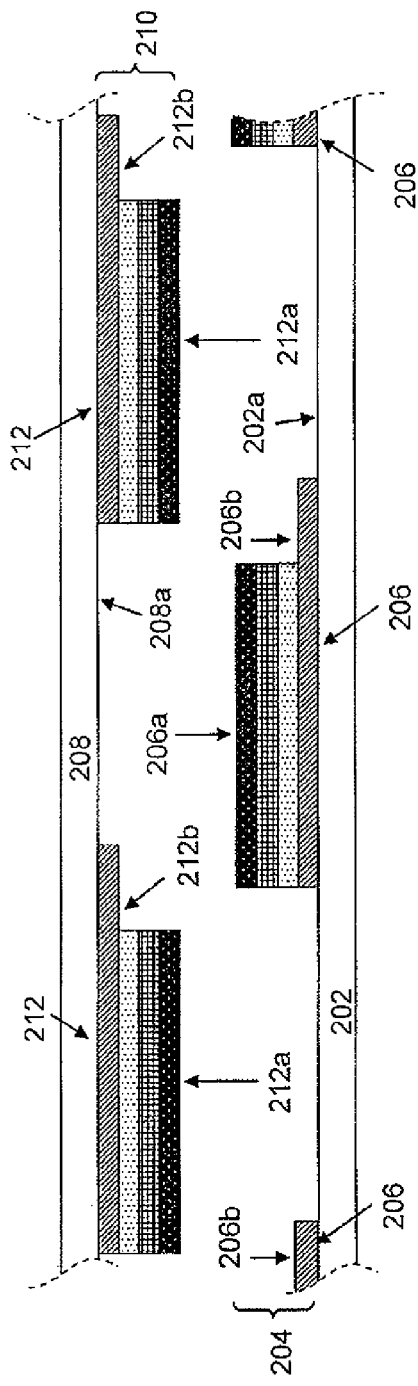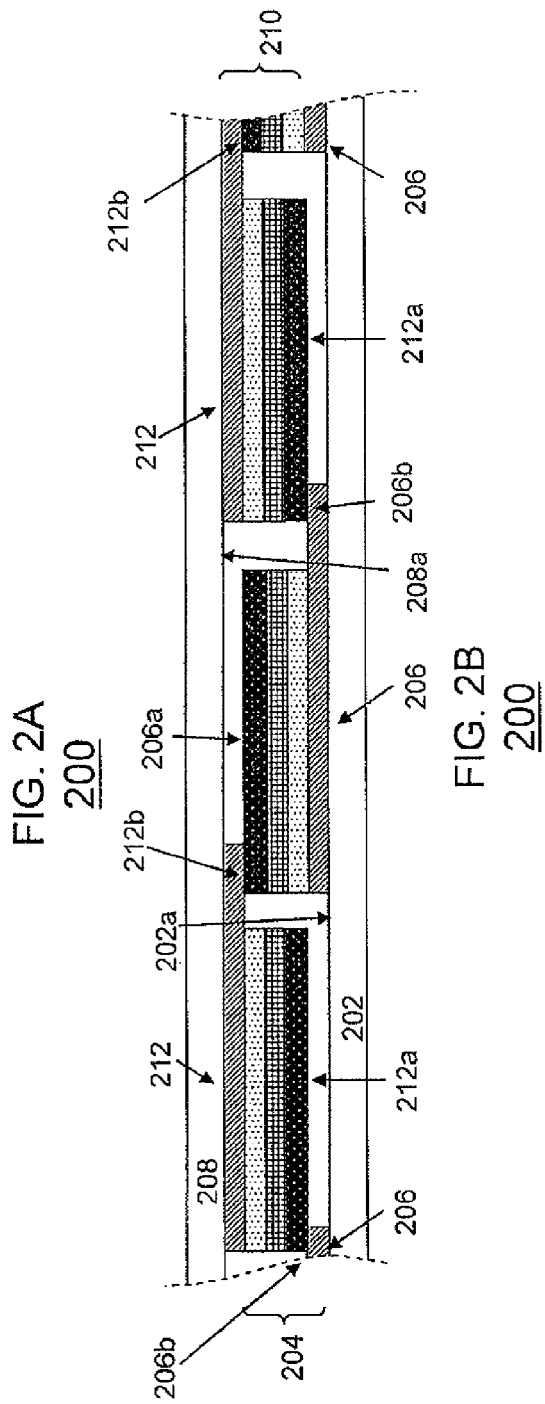

300

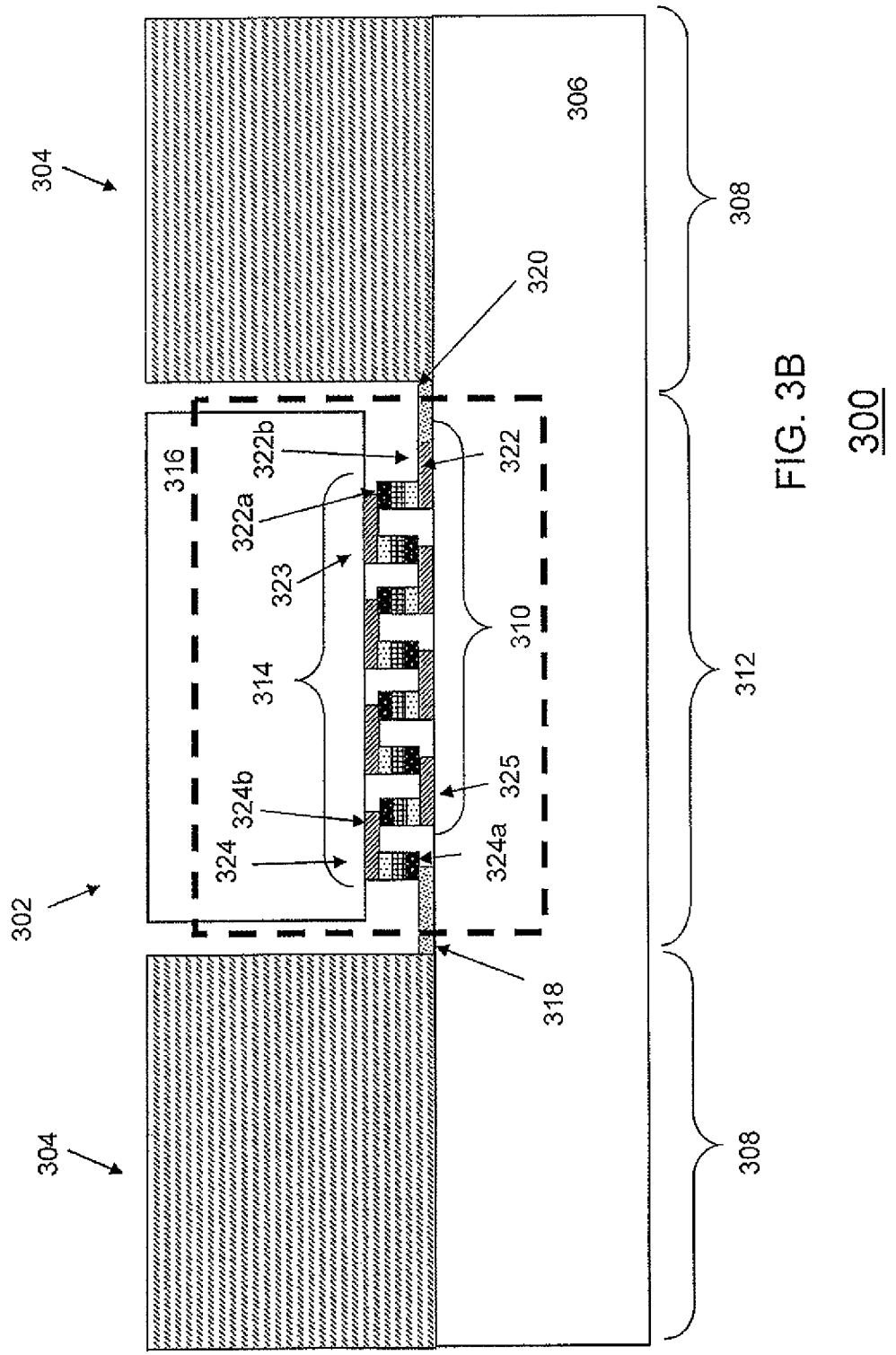

400

600

700

800

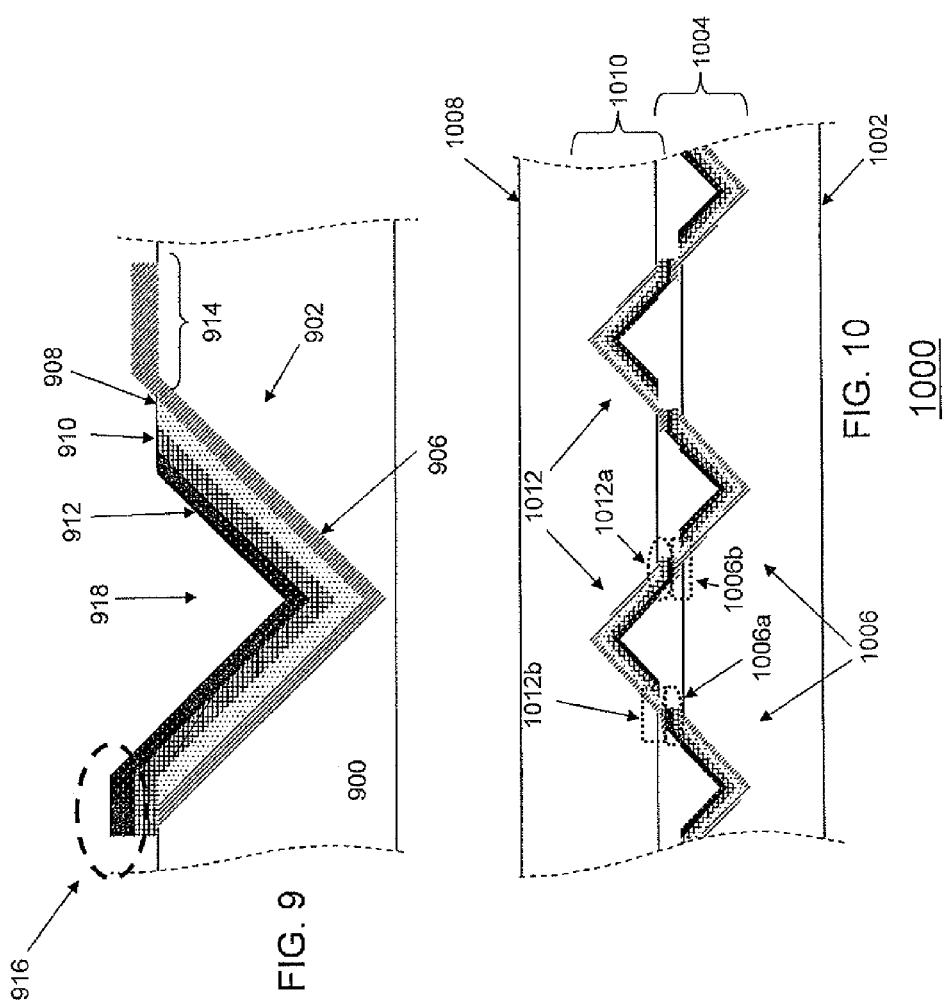

DUAL LAYER SOLID STATE BATTERIES

FIELD OF THE INVENTION

The present invention relates to devices including batteries and methods for forming the same, and more specifically to devices including dual layer solid state batteries and methods for forming the same.

BACKGROUND

Micro-Electro-Mechanical Systems (MEMS) typically integrate electronic and mechanical elements, sensors, actuators, and the like on a silicon substrate utilizing micro-fabrication technology. The fabrication and integration of these elements on a single substrate makes possible the realization of complete systems on a chip. However, MEMS radio frequency and optical relays commonly use electrostatic actuators requiring 80 to 120 volts DC for operation. Consequently, exploitation of the MEMS technologies has generally been limited by the availability of inexpensive, compact sources of energy.

In larger consumer electronic devices, such as notebook computers and cameras, batteries are typically formed by connecting multiple individually packaged cells in series in order to create batteries with more power and higher voltages. Another approach to creating a high voltage battery is to form cathode and anode electrode layers on opposite sides of an impervious conductive foil and then stack the bipolar sheets with intervening ionically conductive electrolyte separators one upon the other. The resulting so called bipolar battery effectively connects each pair of electrodes in series thereby forming a high voltage without requiring a significantly larger amount of space. Such bipolar batteries are difficult to manufacture and are generally not in prevalent use. Moreover, current battery-on-semiconductor technologies generally do not permit the formation of such multi-layer bipolar batteries. For example in the case of lithium thin film batteries in MEMS, anode materials generally cannot be subjected to the anneal temperatures required for cathode materials. Accordingly, the fabrication of anode and cathode on a common conductive substrate is not feasible and such battery structures are generally limited to a single battery cell layer produced by sequentially fabricating the cathode, the ionically conductive electrolyte separator and then the anode individually. As a result, a significant area of a MEMS substrate must be set aside to form a large number of single layer batteries to provide sufficiently high voltages for the device. This limits the minimum size possible for some types of integrated batteries. Accordingly, the minimum size possible for MEMS devices including such batteries is also effectively limited.

SUMMARY

Embodiments of the present invention concern methods for fabrication of dual layer solid state batteries and devices therefrom. In a first embodiment of the invention, an electronic system is provided. The system includes a first substrate having a first surface and a second substrate having a second surface facing the first surface. The system further includes a plurality of battery cell layers disposed on a plurality of laterally spaced areas on the first and second surfaces. In the system, the portions of the battery cell layers on the first surface are in physical contact with portions of the battery cell layers on the second surface. The battery cell layers on the first surface and the second surface form a plurality of electrically interconnected battery cells on the first and the second surfaces that are laterally spaced apart and that define one or more batteries.

In a second embodiment of the invention, a method for forming an electronic system is provided. The method includes providing a first substrate having a first surface and a second substrate having a second surface. The method also includes forming disposing a plurality of battery cell layers on respective plurality of laterally spaced areas on said first and second surfaces. The method further includes aligning the first and the second substrates so that portions of the battery cell layers on the first surface are in physical contact with portions of the battery cell layers on the second surface, where the battery cell layers on the first surface and the second surface form a plurality of electrically interconnected battery cells on the first and the second surfaces that are laterally spaced apart and that define one or more batteries.

BRIEF DESCRIPTION OF THE DRAWINGS

FIG. 1 is a schematic illustration of a portion of a battery substrate, including a battery bank in accordance with an embodiment of the invention.

FIGS. 2A and 2B are exploded and assembled views of a a battery in accordance with an embodiment of the invention.

FIGS. 3A and 3B are exploded and assembled views of a system including a battery in accordance with an embodiment of the invention.

FIG. 9 is a schematic illustration of a portion of yet another battery substrate in accordance with an embodiment of the invention.

FIG. 10 is a schematic illustration of a portion of device including a battery, based on the battery substrate of FIG. 9, in accordance with an embodiment of the invention.

DETAILED DESCRIPTION

Figure 3A:
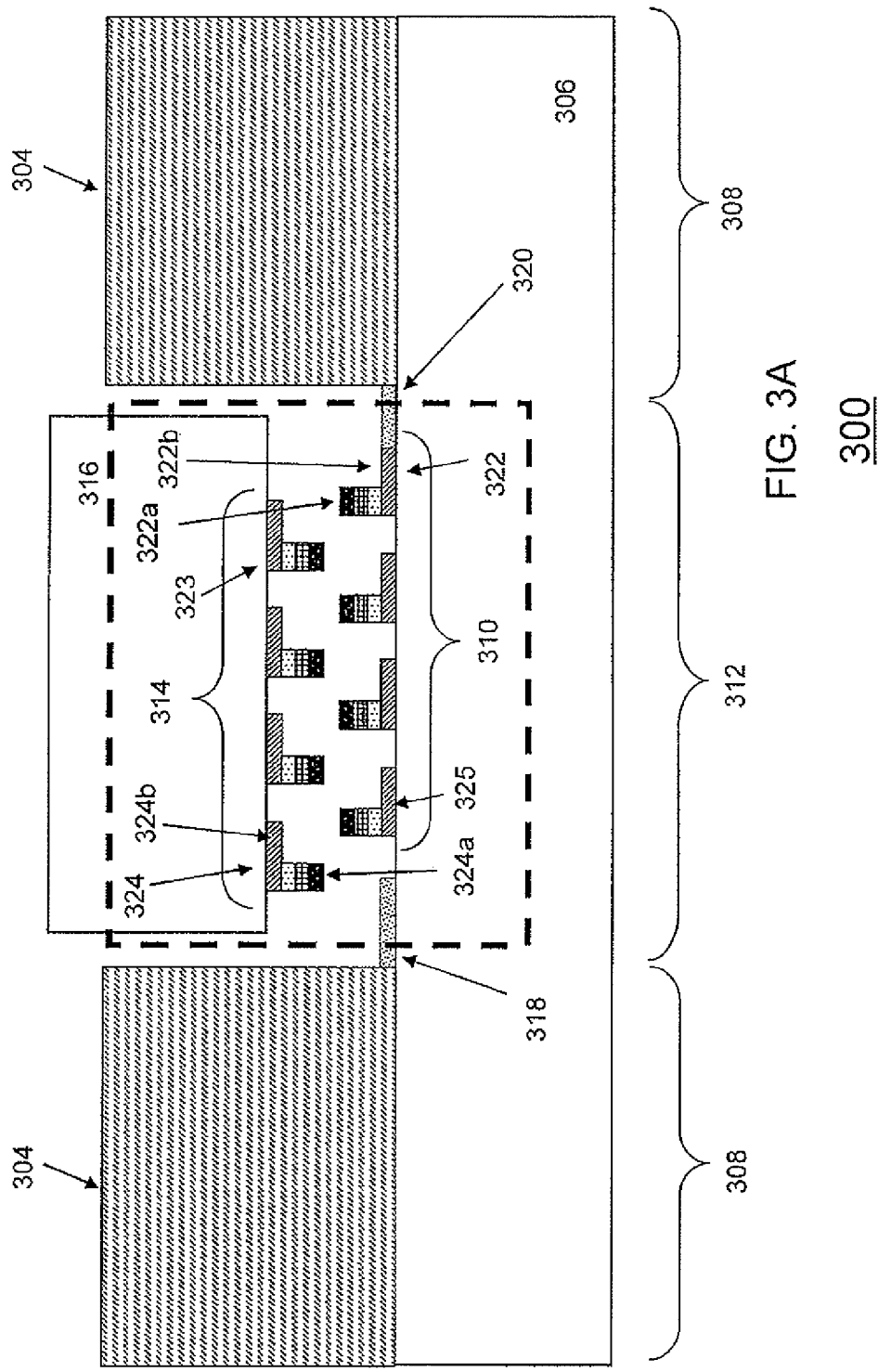

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As described above, one of the inherent limitations for forming batteries for MEMS and similar devices formed on insulating and/or semiconducting substrates is that some of the materials in these batteries cannot be subsequently subjected to the high temperatures needed for forming additional battery layers. For example, the metallic lithium materials, commonly used as an anode in lithium battery cells, generally cannot be subjected to the anneal temperatures needed for forming the lithium cobalt oxide cathode. Accordingly, an integrated battery comprising a stack of electrode layers is generally not possible for MEMS or other similar devices. As defined herein, the term "integrated battery" refers to a battery in which all electrical interconnections between cells are made internal to the battery packaging, as opposed to a battery that is assembled by making external interconnections between separately packaged individual cells. As a result, integrated batteries for MEMS generally require the formation of a large number of laterally spaced battery cells to provide the high voltages necessary for MEMS. Furthermore, such a configuration also requires the formation of wiring structures to interconnect the laterally spaced batteries. These additional wiring structures can also require additional space on a substrate, thus further increasing the surface area needed for the batteries. Consequently, the formation of compact, high voltage integrated batteries is typically difficult to achieve for MEMS devices.

To overcome the limitations of conventional devices, embodiments of the invention provide devices including compact dual substrate batteries and methods for forming the same. In the various embodiments of the invention, a device including such compact batteries is formed by providing a first substrate having a first battery bank formed thereon and a second substrate having a second battery bank disposed thereon. Each of the battery banks comprises one or more battery cells. In the various embodiments of the invention, the substrates are positioned to bring the first battery bank in physical and electrical contact with the second battery bank. This results in a series arrangement of the battery cells, with reduced space and wiring. This is conceptually illustrated with respect to FIGS. 1-3.

Although the various embodiments of the invention will be described primarily with respect to lithium battery technologies and chemistries, the invention is not limited in this regard. Rather the systems and methods described herein are equally applicable to any other battery technologies and chemistries. For example, the various embodiments of the invention can be used with other chemistries, such as zinc carbon, zinc chloride, alkaline, oxy nickel hydroxide, mercury oxide, zinc-air, silver oxide (silver-zinc), nickel cadmium, nickel-metal hydride, and lithium ion chemistries, to name a few. In the case of battery technologies using liquid or migrating solid or gelled electrolyte materials, the battery cells can require retention structures or alternative processes to retain the electrolyte material in place during fabrication.

FIG. 1 is a schematic illustration of a portion of a battery substrate 100, including a battery bank 102 in accordance with an embodiment of the invention. As shown in FIG. 1, battery bank 102 comprises a series of battery cells 104 disposed on the substrate 100. The battery cells 104 each consist of a plurality of battery cell layers. In particular, the battery cell layers include a cathode current collector layer portion 106 disposed on substrate 100, a cathode layer portion 108 disposed on portion 106, an electrolyte/separator layer portion 110 disposed on portion 108, and an anode layer portion 112 disposed on portion 110. For example, in the case of a lithium battery cell, portions 106, 108, 110, and 112 can comprise a copper comprising portion, a lithium cobalt oxide portion, a lithium phosphorous oxynitride (LiPON), and a metallic lithium portion, respectively. The portions 106-112 are disposed on the surface of substrate 100 in laterally spaced areas 101 of substrate 100. The term "laterally spaced", as used herein with respect to the placement of objects or different locations, refers to objects or locations that are disposed adjacent to each other on a common surface. However, the term "laterally spaced" also refers to adjacent areas on different surfaces that that are partially overlapping, as described below.

In the various embodiments of the invention, the portions 106-112 of the battery cells 104 are also arranged to have contact features that extend laterally. That is, the battery cells 104 include first and second adjacent surface regions along substrate 100 for contacting anode layer portion 112 and cathode layer portion 108. For example, as shown in FIG. 1, the current collector layer portion 106 (electrically contacting cathode layer portion 108) can extend further along substrate 100 as compared to portions 108-112. This extending portion defines a cathode contact region 114 for each battery cell 104. An anode contact region 116 can be defined by the top or uppermost portion of each anode layer portion 112. In the various embodiments of the invention, the cathode contact regions 114 and the anode contact regions 116 are alternatively arranged in series in each bank 102. That is, the batteries 104 in each bank 102 are configured such that only one cathode contact region 114 is defined between two anode contact regions 116. As a result, an alternating series of cathode contact regions and anode contact regions is provided across the substrate 100.

Additionally, in the various embodiments of the invention, the battery cells 104 are electrically disconnected or isolated on substrate 100. That is, electrical connections are not generally provided between two cells in the same bank. Accordingly, the upper surface of substrate 100 can comprise an electrically insulating material to provide isolation between adjacent battery cells 104 in battery bank 102. For example, in one embodiment, the electrically insulating material can comprise a silicon oxide ($Si_xO_{1-x}$) comprising material disposed on a silicon comprising substrate. However, the various embodiments of the invention are not limited in this regard. Rather, any type of electrically insulating material can be used. Alternatively, a bottom surface of current collector layer portion 106 can comprise an electrically insulating material.

As shown in FIG. 1, the battery cells 104 are physically separated on the substrate 104. In the various embodiments of the invention, the lateral spacing between battery cells 104 is selected to allow a second bank of battery cells, disposed on a second substrate, to contact the cathode contact regions 114 and anode contact regions 116 to electrically connect the battery cells 104 in series with the battery cells on the second substrate. Such a configuration is described with respect to FIGS. 2A and 2B.

FIGS. 2A and B are exploded and assembled views of a portion of a battery 200 in accordance with an embodiment of the invention. As shown in FIGS. 2A and 2B, the battery 200 includes a first battery substrate 202 having a first battery bank 204 of battery cells 206 disposed thereon and a second battery substrate 208 having a second battery bank 210 of battery cells 212 disposed thereon. The configuration of first battery substrate 202 and first battery bank 204 is similar to the configuration shown in FIG. 1. Accordingly, the description above is sufficient for describing first battery substrate 202 and first battery bank 204. Similarly, the configuration of second battery substrate 208 and second battery bank 210 is similar to the configuration shown in FIG. 1. Accordingly, the description above is sufficient for describing second battery substrate 208 and second battery bank 210.

To assemble battery 200, battery substrate 202 and 208 are positioned such that their upper surfaces 202a and 208a, respectively, having battery cells 206 and 212 formed thereon, respectively, are facing each other. As a result, battery cells 212 are inverted with respect to battery cells 204. In addition, battery substrate 202 and 208 are placed in proximity to each other so that battery cells 206 physically and electrically contact battery cells 212. In particular, substrates 202 and 208 are positioned such that an anode contact region 206a of a battery cell 206 electrically and physically contacts a cathode contact region 212b of a battery cell 212. Further, an anode contact region 212a of a battery cell 212 electrically and physically contacts a cathode contact region 206b of a battery cell 206. Accordingly, the series of anode/cathode contacts results in a plurality of series-connected battery cells.

In the embodiment shown in FIGS. 2A and 2B, the substrates 202 and 208 are approximately parallel. However, the various embodiments of the invention are not limited in this regard. In some embodiments of the invention, depending on the thickness of the various layers of each battery cell along each battery bank, a substantially non-parallel arrangement can occur.

As described above, the lateral battery cell spacing in each of battery banks 204 and 210 allows the battery cells 206 and 212 to come into physical and electrical contact. In particular, the lateral cell spacing in battery banks 204 and 210 is selected to allow at least a portion of an anode contact region 212a of one battery cell 206 to be inserted between two adjacent battery cells 212 in battery bank 210. Furthermore, the combined height of the anode, cathode, and electrolyte portions in battery cells 206 and 212 are selected to allow the anode contact region 206a of a battery cell 206 to contact the cathode contact region 212b of a first one of adjacent battery cells 212 and to allow the cathode contact region 206b of a battery cell 206 to contact an anode contact region 212a of a second of adjacent battery cells 212.

Similarly, the lateral cell spacing in battery banks 204 and 210 is also selected to allow at least a portion of an anode contact region 212a of one of battery cells 212 to be inserted between two adjacent battery cells 206 in battery bank 210. Furthermore, the combined height of the anode, cathode, and electrolyte portions in battery cells 206 and 212 are selected to allow the anode contact region 212a of battery cell 212 to contact the cathode contact region 206b of a first of adjacent battery cells 206 and to allow the cathode contact 212b region of battery cell 212 to contact an anode contact region 206a of a second of adjacent battery cells 206.

Although FIG. 2B shows that an anode contact region 206a of battery cell 206 contacts relatively small portion of a cathode contact region 212a of one of battery cells 212, the invention is not limited in this regard. In the various embodiments of the invention, the amount of contact between an anode contact region and a cathode contact region can vary. For example, if the materials comprising the anode contact region and the cathode contact region provide a relatively high contact resistance, the size of the cathode contact region can be increased to reduce contact resistance. In other embodiments, the size of the cathode contact region can be adjusted based on manufacturing tolerances or design constraints.

As described above, the various embodiments of the invention can be used to provide compact integrated batteries for integrated systems, such as MEMS systems. Accordingly, a battery in accordance with an embodiment of the invention can be used to provide an integrated system on a single substrate. This is described below with respect to FIGS. 3A and 3B.

FIGS. 3A and 3B are exploded and assembled views of a system 300 including a battery 302 (unassembled in FIG. 3A) in accordance with an embodiment of the invention. As shown in FIGS. 3A and 3B, devices and other circuitry 304 can be formed on a system substrate 306 in one or more device regions 308. Additionally, a first battery bank 310 can be formed in a battery region 312 of the system substrate 306. The configuration of first battery bank 310 is similar to the configuration shown in FIG. 1. Accordingly, the description above is sufficient for describing first battery bank 310.

In system 300, battery 302 is formed by providing a second battery bank 314 of battery cells on a second substrate 316. The configuration of battery bank 314 on substrate 316 is similar to the configuration shown in FIG. 1. Accordingly, the description above is sufficient for describing battery bank 314. The second battery bank 314 is then placed in electrical and physical contact with battery bank 312, as shown in FIG. 3B. The resulting battery 310 is similar to the battery described above with respect to FIG. 2B, where inverted battery cells of battery bank 314 are in physical and electrical contact with the battery cells of battery bank 310. Thus, a alternating series arrangement of battery cells from battery banks 310 and 314 is provided, similar to the battery in FIG. 2B. Accordingly the arrangement and operation described in FIG. 2B is sufficient for describing the configuration and operation of battery 302.

Once assembled, battery 302 can be used in system 300 to provide electrical power to devices 304. In the embodiment shown in FIGS. 3A and 3B, the battery 302 is electrically connected to devices 304 via power connections 318 and 320. The power connections 318 and 320 can be used to electrically contact the endmost battery cells in battery 302 to devices 304. The term "endmost", as used herein with respect to battery cells, refers to the first and last battery cells of a series of battery cells in a battery. For example, in the case of system 300, the connected battery banks 310 and 314 provide a series arrangement of battery cells having a first endmost battery cell 322 on substrate 306 and a second endmost battery cell 324 on substrate 316. Power connections 318 and 320 can be configured in a variety of ways, depending on the configuration of the endmost battery cells.

In a first configuration for a power connection, an endmost battery cell can on a substrate different from the system substrate and having an anode contact region that is not connected to other battery cells in the battery. Such a configuration is shown in FIGS. 3A and 3B by endmost battery cell 324. As shown in FIGS. 3A and 3B, endmost battery cell 324 is inverted with a cathode contact region 324b contacting a next battery cell 325 in battery 302. However, the anode contact region 324a of endmost battery cell 324 is not in contact with any other battery cell. Instead, as shown in FIGS. 3A and 3B, power connection 318 is configured to extend from one of devices 304 to an area beneath the anode contact region 324a of endmost battery cell 324. Thus, when substrate 316 is brought into proximity with substrate 306, the anode contact region 324a of endmost battery cell 324 physically and electrically contacts power connection 318. In such embodiments, the power connections 318 can be configured in a variety of ways. For example, power connection 318 can have a first portion extending from devices 304 and terminating in in contact pad portion beneath anode contact region 324a to facilitate contacting of the anode contact region 324a of endmost battery cell 324. However, the various embodiments of the invention are not limited in this regard.

In a second configuration for a power connection, an endmost battery cell can be on the system substrate and having a cathode contact region that is not connected to other battery cells in the battery. Such a configuration is shown in FIGS. 3A and 3B by endmost battery cell 322. As shown in FIGS. 3A and 3B, an anode contact region 322a of endmost battery cell 322 is in contact with a previous battery cell 323 in battery 302. However, the cathode contact region 322b of endmost battery cell 322 is not in contact with any other battery cell. Instead, as shown in FIGS. 3A and 3B, power connection 320 is configured to extend from one of devices 304 and contact the cathode contact region 322b of endmost battery cell 322. In such embodiments, power connection 320 can be configured in a variety of ways. For example, power connection and the cathode current collector portion of endmost battery cell 322 can be integrally formed. In another example, power connection 320 can at least partially overlap the cathode current collector portion of endmost battery cell 322. However, the various embodiments of the invention are not limited in this regard.

Figure 4:
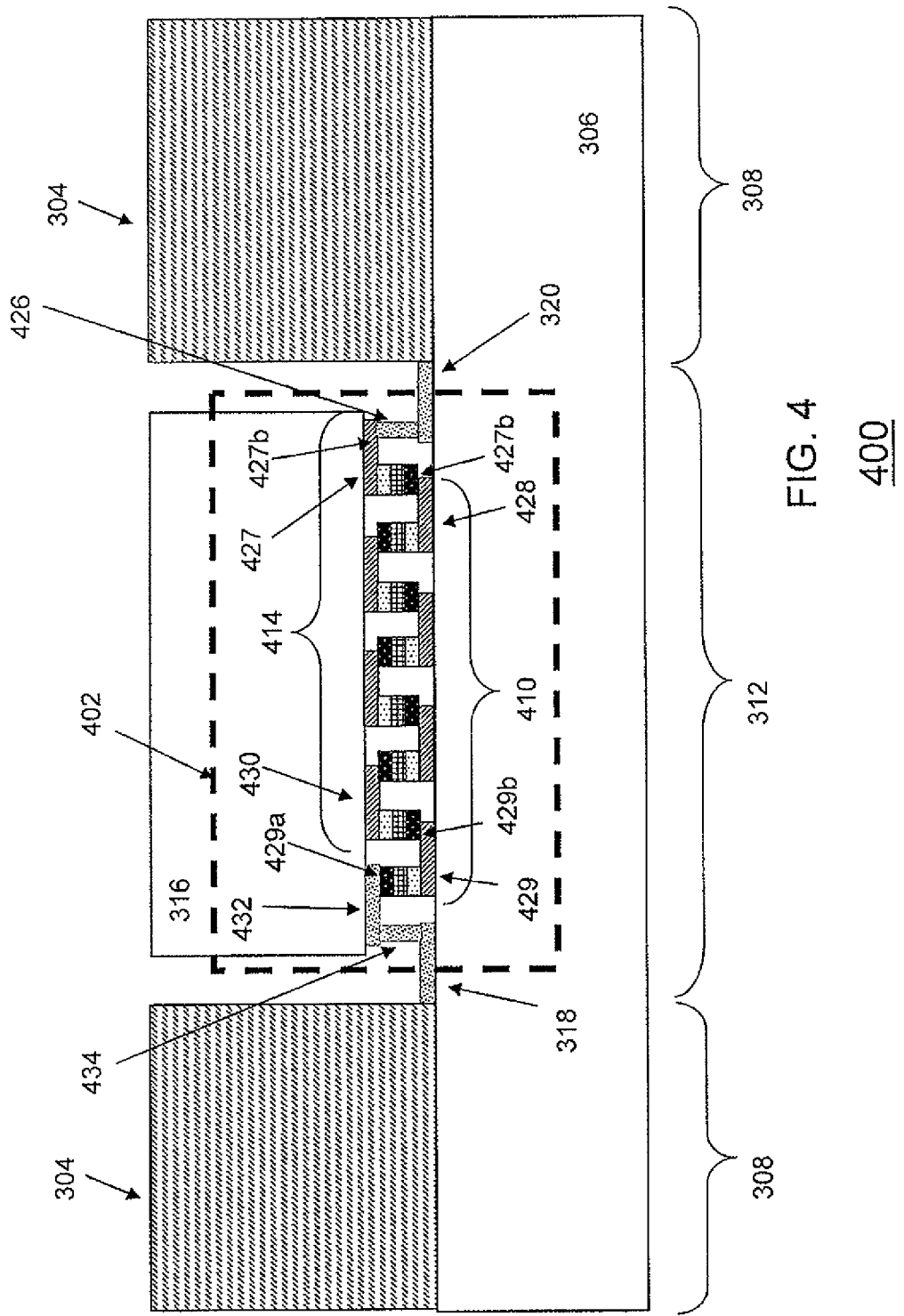
FIG. 4 shows an assembled view of a system including battery and an alternate configuration of power connections in accordance with an embodiment of the invention.

In other configurations for power connections, additional connection features may be needed to contact the endmost battery cells in some embodiments of the invention. This is illustrated in FIG. 4. FIG. 4 shows an assembled view of a system 400 including battery 402 and an alternate configuration of power connections in accordance with an embodiment of the invention. The configuration of the system 400 shown in FIG. 4 is similar to that shown in FIGS. 3A and 3B. In particular, FIG. 4 includes components, the same or similar to components 302-320 described above with respect to FIGS. 3A and 3B. However, in the case of system 400, a battery 402, including connected battery banks 410 and 414 is provided. The battery banks 410 and 414 provide a series arrangement of battery cells having a first endmost battery cell 427 on substrate 316 and a second endmost battery cell 429 on substrate 306.

Therefore, in a third configuration for a power connection, an endmost battery cell can be on a substrate different from the system substrate and having a cathode contact region that is not connected to other battery cells in the battery. Such a configuration is shown in FIG. 4 by endmost battery cell 427. As shown in FIG. 4, endmost battery cell 427 is inverted with an anode contact region 427a contacting a previous battery cell 428 in battery 402. However, the cathode contact region 427b of endmost battery cell 427 is not in contact with any other battery cell. Further, if power connection 320 is extended laterally to contact endmost battery cell 427, only the anode contact region 427a of this battery cell would be contacted. As a result, the power, current, and voltage provided by endmost battery cell 427 would not be available for battery 402. Accordingly, to contact battery cells in such a configuration, a power terminal 426 is configured to extend vertically from power connection 320. Additionally power connection 320 and power terminal 426 are configured to have a combined height equal to the height of battery cells in battery bank 310. Thus, when substrate 316 is brought into proximity with substrate 306, the cathode contact region of endmost battery cell 427 physically and electrically contacts power terminal 426. In such embodiments, the power terminal 426 can be provided in a variety of ways. For example, in some embodiments of the invention, power terminal 426 can be provided by applying a conductive adhesive, such as a conductive epoxy or solder material to power connection 320. Afterwards, substrate 316 can be positioned on substrate 306. In another example, power terminal 426 and power connection 320 can be formed using the same fabrication steps used to form devices 304 and/or battery bank 410. However, the various embodiments of the invention are not limited in this regard.

In a fourth configuration for a power connection, an endmost battery cell can be on the system substrate, but having an anode contact region that is not connected to other battery cells in the battery. Such a configuration is shown in FIG. 4 by endmost battery cell 429. As shown in FIG. 4, endmost battery cell 429 has a cathode contact region 429b contacting an next battery cell 430 in battery 402. However, the anode contact region 429a of endmost battery cell 429 is not in contact with any other battery cell. Further, if power connection 318 is extended laterally to contact endmost battery cell 429, only the cathode contact region 429b of this battery cell would be contacted. As a result, the power, current, and voltage provided by endmost battery cell 429 would not be available. Alternatively, if power connection 318 is extended laterally and vertically over endmost battery cell 429, additional electrical insulating material would be needed to prevent power connection 318 from shorting the anode and cathode of endmost battery cell 429. This introduces additional complexity into the design and fabrication of battery cell 402 that is undesirable.

Accordingly, battery cells in such a configuration can be contacted by providing a contact pad 432 on substrate 316 and a contact terminal 434 extending vertically between power connection 318 and contact pad 432. Additionally, contact pad 432 and power terminal 434 are configured to have a combined height equal to the height of battery cells in battery bank 414. Further, contact pad 432 is configured to have a height equal to the thickness of the cathode current collector portion of the battery cells in battery bank 414. Thus, when substrate 316 is brought into proximity with substrate 306, the anode contact region of endmost battery cell 429 physically and electrically contacts contact pad 432 and power terminal 434 contacts power connection 318. In such embodiments, the power terminal 434 can be provided in a variety of ways. For example, in some embodiments of the invention, power terminal 434 can be provided by applying a conductive adhesive, such as a conductive epoxy or solder material to power connection 318 or contact pad 432. Afterwards, substrate 316 can be positioned on substrate 306. In another example, power terminal 434 and contact pad 432 can be formed using the same fabrication steps used to form battery bank 414. In yet another example, power terminal 434 and power connection 318 can be formed using the same fabrication steps used to form devices 304 and/or battery bank 414. However, the various embodiments of the invention are not limited in this regard.

The various embodiments of the invention are not limited to solely the connection configurations illustrated in FIGS. 3B and 4. In the various embodiments of the invention, any combination of connection types described above can be used in a single system, depending on the configuration of the battery cells in the battery banks.

In the various embodiments illustrated above in FIGS. 3A, 3B, and 4, the devices are positioned laterally with respect to a battery in accordance with the invention. That is, devices are formed on a same surface as the battery cells. However, the invention is not limited in this regard and other configurations are possible. For example, alternative configurations are shown in FIGS. 5 and 6.

Figure 5:
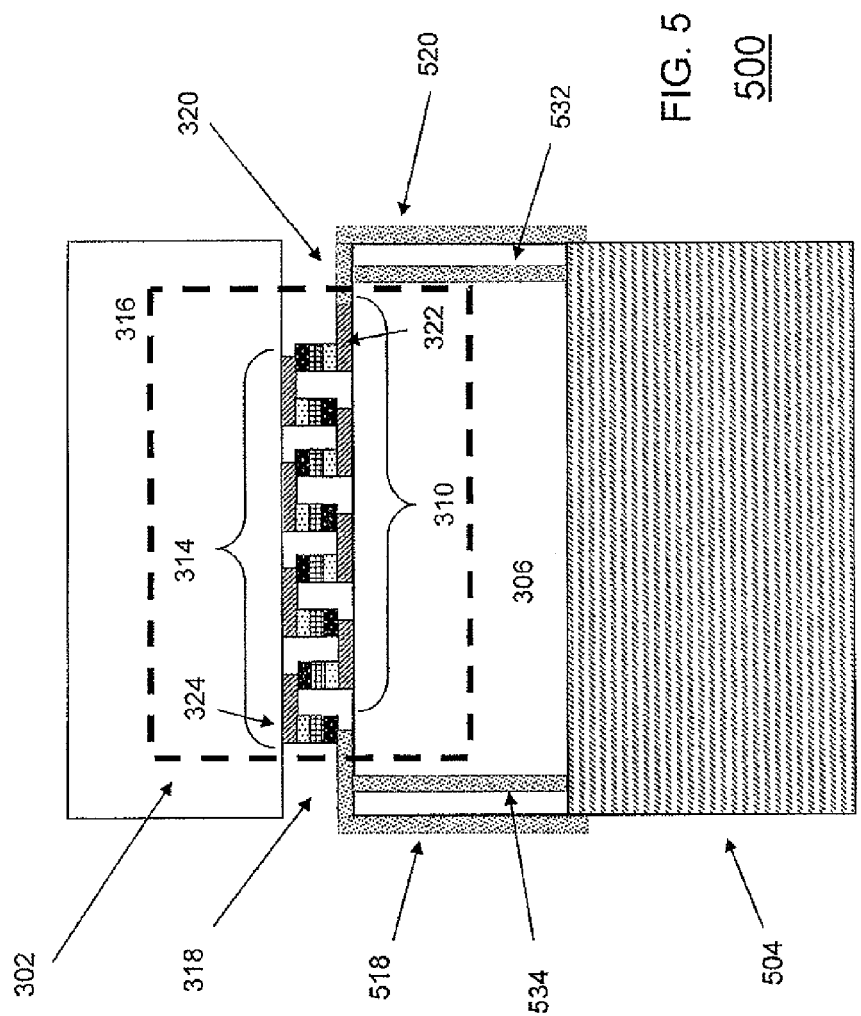
FIG. 5 shows an assembled view of a stacked system including a battery in accordance with an embodiment of the invention.
Figure 6:
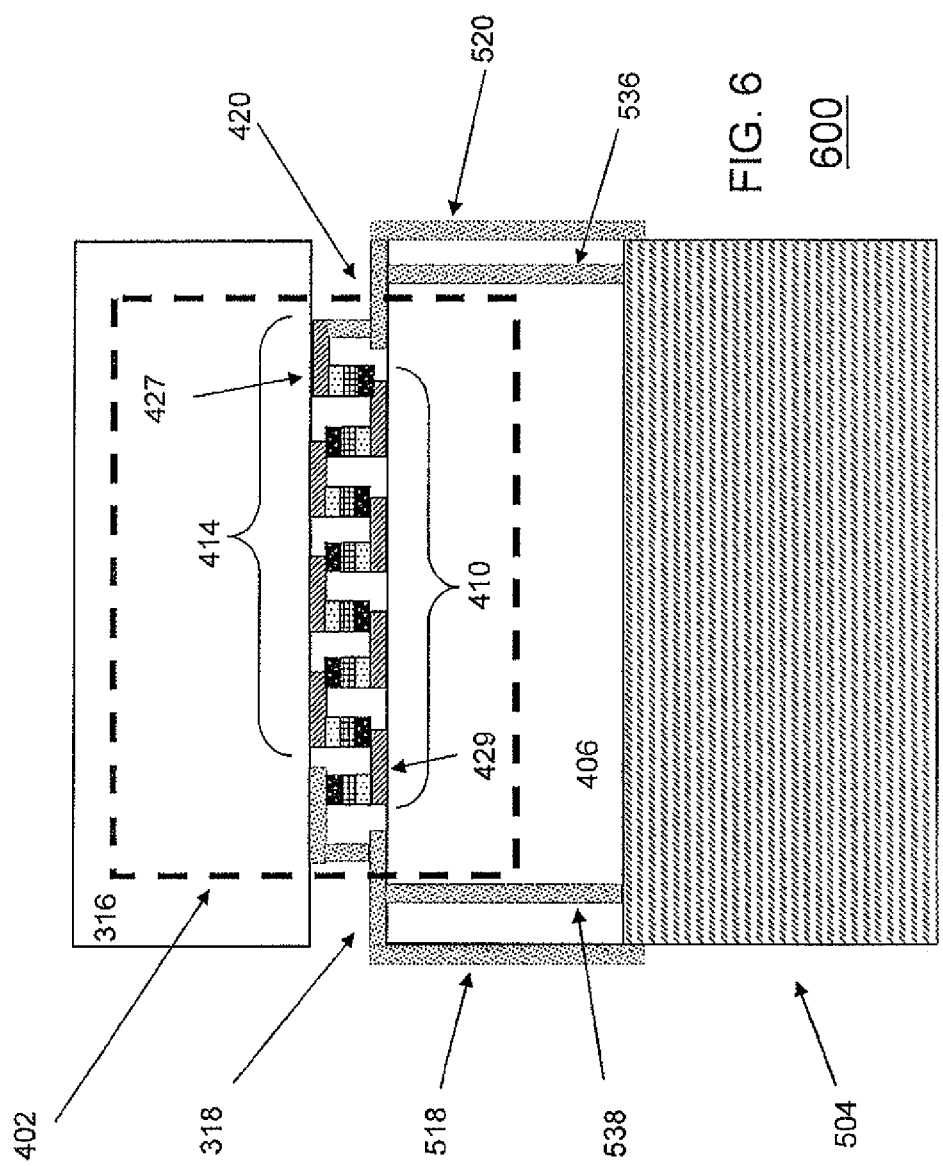
FIG. 6 shows an assembled view of another stacked system including a battery and an alternate arrangement of power connections in accordance with another embodiment of the invention.

FIG. 5 shows an assembled view of a stacked system 500 including a battery 302 in accordance with an embodiment of the invention. The configuration of the system 500 shown in FIG. 5 is similar to that shown in FIGS. 3A and 3B. FIG. 6 shows an assembled view of another stacked system 600 including a battery 402 and an alternate arrangement of power connections in accordance with another embodiment of the invention. The configuration of the system 600 shown in FIG. 6 is similar to that shown in FIG. 4. However, in the case of systems 500 and 600, the devices 504, respectively, are not positioned on the same surface of the system substrate on which a respective battery is formed. Rather the devices 504 are formed on an opposing surface of system substrate 306 in systems 500 and 600. Such a configuration provides a stacked structure of a battery and devices. As a result, the size of systems 500 and 600 can be reduced as compared to systems 300 and 400, respectively.

In systems 500 and 600, electrical connections to batteries 302 and 402, respectively, can be provided in a variety of ways. First, batteries 302 and 402 can be connected to power connections 318 and 320, as described above with respect to FIGS. 3A, 3B, and 4. For example, in some embodiments, the configuration of FIG. 5 for connecting endmost battery cells 322 and 324 of battery 302 to power connections 320 and 318, respectively, can be used. In other embodiments, the configuration of FIG. 6 for connecting endmost battery cells 323 and 325 to power connections 320 and 318, respectively, can also be used. Additionally any combination of these connections can also be used, depending on the configuration of the battery banks provided.

Next connection of power connections 318 and 320 to devices 504 can be accomplished in several ways. In a first configuration, connections can be made through system substrate 306. For example, electrically conductive elements can be formed in substrate 306 using thru substrate vias 536 and 538, as shown in FIGS. 5 and 6. In such a configuration, an opening or via can be formed in substrate 306 between its upper and lower surfaces. The opening or via can then be at least partially filled with an electrically conductive material to provide an electrically conductive connection. In a second configuration, connections can be made around substrate 306. In such configurations, power connections 318 and 320 can extend around substrate 306 and electrically contact devices 304. This is shown in FIGS. 5 and 6 by the extension portions 518 and 520 of power connections 318 and 320, respectively. However, the various embodiments of the invention are not limited to solely one connection type between battery 302 and devices 304. In the various embodiments of the invention, any combination of connection types described above can be used in a single system.

In the various embodiments described above, the battery cells include layers that extend parallel to the substrate they are formed upon. However, such a configuration ultimately limits the current and voltage that can be supplied, since such parameters are ultimately defined by the surface area of the various layers or portions of each battery cell. In view of this limitation, another aspect of the invention provides the layers in the battery cells to extend at least partially in a vertical direction. As a result, the total surface area of the layers of each battery cell can be increased without needing to increase the total amount of area needed on a substrate. This is conceptually illustrated in FIGS. 7-10.

Figure 7:
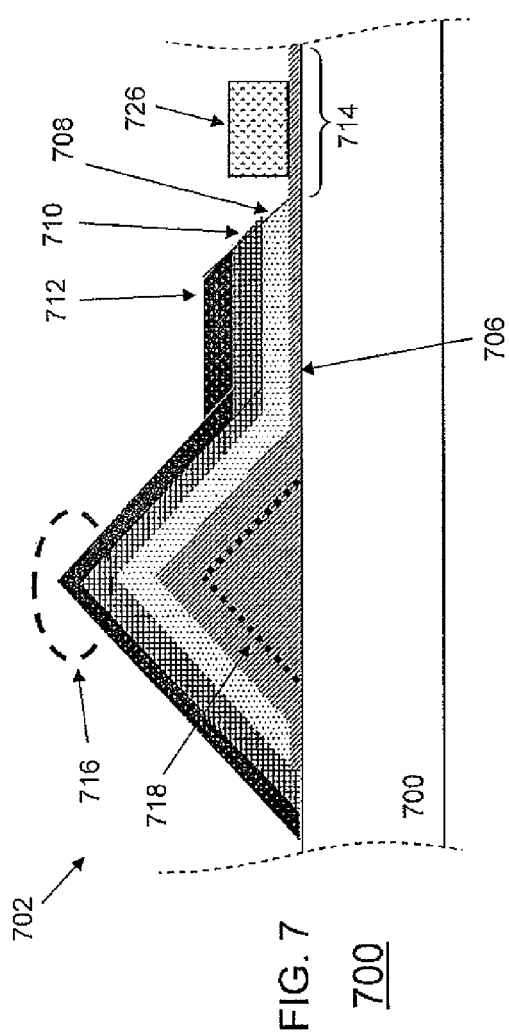
FIG. 7 is a schematic illustration of a portion of another battery substrate in accordance with an embodiment of the invention.

FIG. 7 is a schematic illustration of a portion of a battery substrate 700 in accordance with an embodiment of the invention. Like the battery substrate in FIG. 1, the battery substrate 700 includes a battery bank including at least one battery cell 702 having a cathode current collector layer portion 706 disposed on substrate 700, a cathode layer portion 708 disposed on portion 706, an electrolyte/separator layer portion 710 disposed on portion 708, and an anode layer portion 712 disposed on portion 710.

Like the battery cells in FIG. 1, the portions 706-712 of the battery cell 702 are also arranged to have contact features that extend laterally. That is, the battery cells 702 include first and second adjacent surface regions extending along substrate 700 for contacting anode layer portion 712 and cathode layer portion 708. For example, as shown in FIG. 7, the current collector layer portion 706 (electrically contacting cathode layer portion 708) can extend further laterally as compared to portions 708-712 to define a cathode contact region 714 for battery cell 702. An anode contact region 716 can be defined by the top or uppermost portion of anode layer portion 712. In the various embodiments of the invention, the cathode contact regions 714 and the anode contact regions 716 are alternatively arranged in series, as described above in FIG. 1. That is, the battery cells on substrate 700 are configured such that only one cathode contact region 714 is defined between two anode contact regions 716 in a battery bank. As a result, an alternating series of cathode contact regions and anode contact regions is provided across the substrate 700 in a battery bank.

Unlike the battery cells in FIG. 1, the battery cell in FIG. 7 also extends vertically and laterally. In the embodiment illustrated in FIG. 7, this is achieved by forming layer 706 to include at least one portion of a greater thickness than the extending portion defining cathode contact region 714. Thus, after layers 708-712 are formed, a battery cell with an effective larger area is formed, but over the same area of substrate 700. Such a larger area battery cell can therefore provide a larger capacity cell with increased current draw capabilities than a battery cell extending solely in lateral directions, such as the battery cells in FIGS. 1-6. Accordingly, as compared to conventional integrated batteries, an integrated battery with substantially the same footprint as a conventional integrated battery can be fabricated that provides substantially higher voltage, capacity, and current draw capabilities. Such a battery is shown in FIG. 8.

Figure 8:
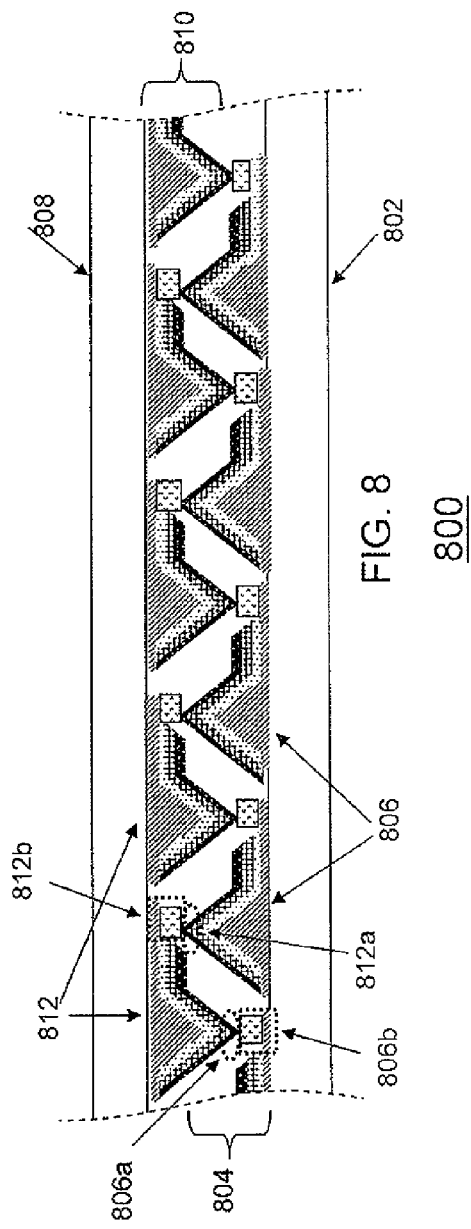
FIG. 8 is a schematic illustration of a portion of a device including a battery, based on the battery substrate of FIG. 7, in accordance with an embodiment of the invention.

FIG. 8 is a schematic illustration of a portion of a battery 800, based on the battery substrate of FIG. 7, in accordance with an embodiment of the invention. As shown in FIG. 8, the battery 800 includes a first battery substrate 802 having a first battery bank 804 of battery cells 806 disposed thereon and a second battery substrate 808 having a second battery bank 810 of battery cells 812 disposed thereon. The configuration of the battery cells in first battery substrate 802 and first battery bank 804 is similar to the configuration shown in FIGS. 1 and 7. Accordingly, the description above is sufficient for describing first battery substrate 802 and first battery bank 804. Similarly, the configuration of second battery substrate 808 and second battery bank 810 is similar to the configuration shown in FIGS. 1 and 7. Accordingly, the description above is sufficient for describing second battery substrate 808 and second battery bank 810.

To assemble battery 800, battery substrate 802 and 808 are positioned such that their upper surfaces 802a and 808a are opposing (i.e. facing each other). That is, upper surface 802a, having battery cells 806 formed thereon, and upper surface 808a, having battery cells 812 formed therein, are arranged to face each other. As a result, battery cells 812 are inverted with respect to battery cells 806. In addition, battery substrate 802 and 808 are placed in proximity to each other so that battery cells 806 physically and electrically contact battery cells 812.

In particular, substrates 802 and 808 are positioned such that an anode contact region 806a of a battery cell 806 electrically and physically contacts a cathode contact region 812b of a battery cell 812 and such that an anode contact region 812a of a battery cell 812 electrically and physically contacts a cathode contact region 806b of a battery cell 806. Accordingly, the collection of anode/cathode contacts results in a plurality of series-connected battery cells, similar to the configuration shown in FIGS. 1-6.

Although the embodiment in FIGS. 7 and 8 shows a triangular cross-section for the thicker portion of the cathode current collector layer, the various embodiments of the invention are not limited in this regard. In the various embodiments of the invention, the cross-section shape of the cathode current collector layer can be configured to have any other shape. For example, the cross-section shape can be rectangular, elliptical, or trapezoidal. However, the invention is not limited in this regard.

In some cases direct contact of the anode contact region and the cathode contact region can result in alloying of the metals comprising the anode layer and the cathode current collector layer. If the anode contact region and the cathode contact region are in contact over a relatively large area, the alloying will not generally adversely affect the electrical contact between the two regions. However, in the case of the battery of FIG. 8, the anode contact region is contacting the cathode contact region over a relatively small area. Accordingly, even if a relatively small amount of alloying occurs, the variation in the properties of the electrical contact can vary significantly. This can increase, for example, the contact resistance between the layers, resulting in reduced current and voltage being delivered by the battery. Therefore, in some embodiments of the invention, a barrier metal contact pad can be provided. This is shown in FIGS. 7 and 8. In particular, as shown in FIG. 7, battery cell 702 can further include a barrier contact pad 726 formed on cathode contact region 714. Therefore, when such battery cells are used in substrates 802 and 808 in FIG. 8, little or no alloying at the anode contact regions 806a and 812b occurs.

Although the embodiments in FIGS. 7 and 8 illustrate providing a thicker cathode current layer portion to cause the battery cell layers to extend vertically, the various embodiments of the invention are not limited in this regard. For example, in some embodiments of the invention, the substrate can be configured to include features, such as projections or recesses, to cause the layers in each of the battery cells to at least partially extend vertically. In the case of projections, the configuration of the resulting battery is substantially similar to that shown in FIGS. 7 and 8 with the exception that substrate 700 would provide projections, as indicated by the dotted line 718 in FIG. 7, instead of the thicker cathode current collector layer portions. The case of a recess is shown below in FIGS. 9 and 10.

FIG. 9 is a schematic illustration of a portion of yet another battery substrate 900 in accordance with an embodiment of the invention. Like the battery substrate in FIG. 1, the battery substrate 900 includes a battery bank including at least one battery cell 902 having a cathode current collector layer portion 906 disposed on substrate 900, a cathode layer portion 908 disposed on portion 906, an electrolyte/separator layer portion 910 disposed on portion 908, and an anode layer portion 912 disposed on portion 910.

Although the embodiment in FIG. 9 shows a triangular cross-section for the recess 918, the various embodiments of the invention are not limited in this regard. In the various embodiments of the invention, the cross-section shape of the cathode current collector layer can be configured to have any other shape. For example, the cross-section shape can be rectangular, elliptical, or trapezoidal. However, the invention is not limited in this regard.

Unlike the battery cell in FIG. 1, a recess 918 can be provided in substrate 900 for battery cell 902. The layers 906-914 can be deposited on substrate 900 to follow the contour of recess 918. As a result, battery cell extends laterally and vertically to increase its effective area and therefore increase the supplied voltage and current.

Like the battery cells in FIG. 1, the battery cell 902 also includes first and second laterally adjacent regions for contacting anode layer portion 912 and cathode layer portion 908. For example, as shown in FIG. 9, the current collector layer portion 906 (electrically contacting cathode layer portion 908) can extend further laterally in a first direction as compared to portions 908-912 to define a cathode contact region 914 for battery cell 902. In particular, layer 906 can be configured to extend further out of recess 918 in first direction.

An anode contact region 916 can be defined by providing a portion of anode layer 912 that extends out of recess 918 in second direction to form an uppermost portion of anode layer portion 912. In the various embodiments of the invention, the cathode contact regions 914 and the anode contact regions 916 are alternatively arranged in series, as described above in FIG. 1. That is, the battery cells on substrate 900 are configured such that only one cathode contact region 914 is defined between two anode contact regions 916. As a result, an alternating series of cathode contact regions and anode contact regions is provided across the substrate 900.

Thus, after recess 918 and layers 908-912 are formed, a battery cell with an effective larger area is formed. Such a larger area battery cell can therefore provide a larger capacity cell with increased current draw capabilities than a battery cell extending solely in lateral directions, such as the battery cells in FIGS. 1-6. Accordingly, as compared to conventional integrated batteries, an integrated battery with substantially the same footprint as a conventional integrated battery can be fabricated that provides substantially higher voltage, capacity, and current draw capabilities. Such a battery is shown in FIG. 10.

FIG. 10 is a schematic illustration of a portion of a battery 1000, based on the battery substrate of FIG. 9, in accordance with an embodiment of the invention. As shown in FIG. 10, the battery 1000 includes a first battery substrate 1002 having a first battery bank 1004 of battery cells 1006 disposed thereon and a second battery substrate 1008 having a second battery bank 1010 of battery cells 1012 disposed thereon. The configuration of the battery cells in first battery substrate 1002 and first battery bank 1004 is similar to the configuration shown in FIG. 9. Accordingly, the description above is sufficient for describing first battery substrate 1002 and first battery bank 1004. Similarly, the configuration of second battery substrate 1008 and second battery bank 1010 is similar to the configuration shown in FIG. 9. Accordingly, the description above is sufficient for describing second battery substrate 1008 and second battery bank 1010.

To assemble battery 1000, battery substrate 1002 and 1008 are positioned such that their upper surfaces 1002a and 1008a, respectively, having battery cells 1006 and 1012, respectively, are facing each other. As a result, battery cells 1012 are inverted with respect to battery cells 1004. In addition, battery substrate 1002 and 1008 are placed in proximity to each other so that battery cells 1006 physically and electrically contact battery cells 1012. In particular, substrates 1002 and 1008 are positioned such that an anode contact region 1006a of a battery cell 1006 electrically and physically contacts a cathode contact region 1012b of a battery cell 1012 and such that an anode contact region 1012a of a battery cell 1012 electrically and physically contacts a cathode contact region 1006b of a battery cell 1006. Accordingly, the collection of anode/cathode contacts results in a plurality of series-connected battery cells, similar to the configuration shown in FIGS. 1-6.

The battery substrates illustrated in FIGS. 1-10 can be fabricated in a variety of ways. One exemplary method is shown below in FIGS. 11A-11D. FIGS. 11A-11D show cross-sections during various steps of fabricating an exemplary battery substrate in accordance with an embodiment of the invention. In particular, FIGS. 11A-11D show cross-sections for forming the battery cells in FIGS. 9 and 10. However, the various steps in the method described below are equally applicable to fabricating battery substrates in accordance with the various embodiments of the invention.

The fabrication process can begin with providing substrate 900 on which the battery cell 902 is to be formed on. In some embodiments, the substrate 900 can include a semiconducting surface. For example, the substrate can be a monocrystalline semiconductor wafer, a semiconductor-on-insulator (SOI) wafer, a flat panel display (e.g., a silicon layer over a glass plate), or any other type of substrate used to form an electronic device. Substrate 900 can include a dopant, such as including an n-type or p-type dopant. Moreover, substrate 900 can include electronic components or portions of electronic components previously formed thereon. Such electronic components can include for example, implant regions, field isolation regions, or other layers used to form electronic components such as transistors and MEMS devices. However, the invention is not limited in this regard and the electronic components may be formed after formation of battery 902.

Figure 11A:
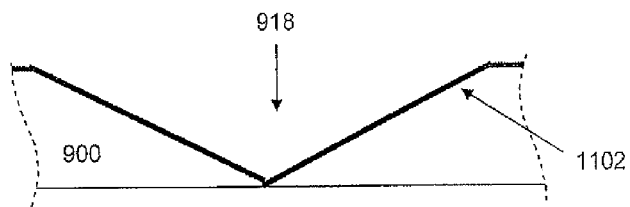
FIGS. 11A-11D show cross-sections during various steps for fabricating an exemplary battery substrate in accordance with an embodiment of the invention.

Once a substrate 900 is provided, vertically extending features can be formed. This is illustrated in FIG. 11A, showing recess 918 being formed in substrate 900. Recess 918 can be formed in a variety of ways. In one embodiment, recesses can be formed by a photolithography technique including use of a reticle to expose particular portions of a resist layer (not shown) deposited on substrate 900 to radiation followed by subsequent removal of the exposed portions to form a patterned resist layer having openings. A removal process can then be used to remove portions of the substrate to form recess 918. In general, the recess 918 can be formed using a selective removal process. In accordance with an embodiment of the invention, the formation of recess 918 includes an etching technique, which can include an anisotropic etch or an isotropic etch using a plasma or other dry etch process. Other embodiments may make use of a wet etch technique. A similar process can be used to form projections.

As described above, the substrate can comprise a semiconducting substrate. Therefore, to provide electrical isolation between the battery cells formed thereon, the remaining surface of substrate must be somehow converted to an electrically non-conductive surface. In one embodiment, this can be accomplished by the growth or deposition of an electrically insulating layer 1102 on substrate 900 and in recesses 918. For example, in the case of a silicon comprising substrate, a silicon oxide comprising layer can be grown or deposited on the substrate after recesses are formed.

Figure 11B:
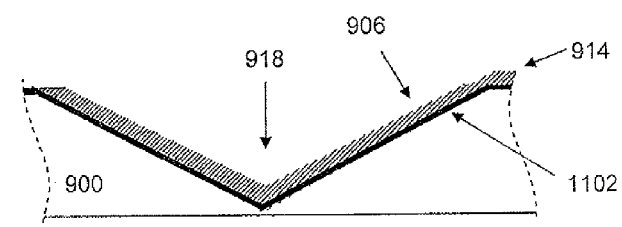
Figure 11C:
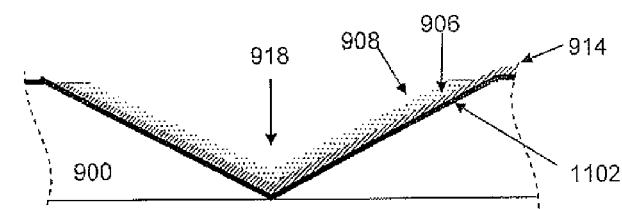
Figure 11D:
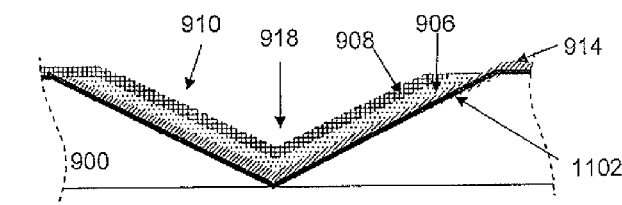
Figure 11E:
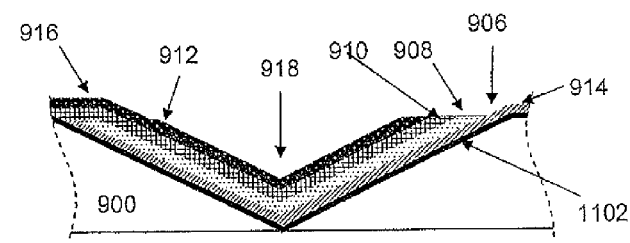

Once recess 918 (and if necessary layer 1102) is formed in substrate 900, the cathode current collector layer portion 906 can be formed on substrate 900 for each battery cell. Cathode current collector layer portion 906 can be formed in a variety of ways. First, a layer of material comprising the cathode current collector layer portion 906 can be deposited on substrate 900. For example, in the case of a lithium cell, a layer of a copper comprising material can be deposited on the substrate. For example, a chemical vapor deposition or an electroplating technique can be used. Additionally, one or more adhesion layers (not shown) can also be formed to improve adhesion between the cathode current collector layer portion 906 and the underlying substrate 900. The cathode current collector layer portion 906 can then be formed for each battery cell by a photolithography technique that defines the cathode current collector layer portion 906 in recess 918 and cathode contact region 914 outside recess 918, as described above. A removal process can then be used to form the cathode current collector layer portion 906. For example, in the case of a copper comprising material, an etching technique can be used, which can include an anisotropic etch or an isotropic etch using a plasma or other dry etch process. Other embodiments may make use of a wet etch technique. The result of this process is shown in FIG. 11B After the cathode current collector layer portion 906 is formed, the cathode layer portion 908 can be formed. Cathode layer portion 908 can be formed in a variety of ways. First, a layer of material comprising the cathode layer portion 906 can be deposited on substrate 900. For example, in the case of a lithium cell, a layer of lithium cobalt oxide material can be deposited on substrate 900 over at least recess 918. For example, a sputtering or chemical vapor deposition technique can be used. The cathode layer portion 908 can then be formed for each battery cell by a photolithography technique that defines a pattern for forming the cathode layer portion 908 in recess 918, as described above. A removal process can then be used to form the cathode layer portion 908. For example, an etching technique can be used, which can include an anisotropic etch or an isotropic etch using a plasma or other dry etch process. Other embodiments may make use of a wet etch technique. Additionally, before or after photolithography and etching, an anneal step is used to cure the lithium cobalt oxide. The result of this process is shown in FIG. 11C Once the cathode layer portion 908 is formed, the electrolyte/separator layer portion 910 can be formed. Electrolyte/separator layer portion 910 can be formed in a variety of ways. First, a layer of material comprising the electrolyte/separator layer portion 910 can be deposited on substrate 900. For example, an electrolyte layer can comprise one or more layers of a solid-state ion conductor or a gelled electrolyte. For example, in the case of a lithium cell, a layer of LiPON material that conducts lithium ions but is electrically insulating can be deposited on substrate 900 over at least recess 918. In some embodiments of the invention, such a LiPON materials can be deposited by magnetron sputtering in a nitrogen plasma. However, the various embodiments of the invention are not limited in this regard and any other methods for depositiing LiPON can be used. The electrolyte/separator layer portion 910 can then be formed for each battery cell by a photolithography technique that defines a pattern for forming the electrolyte/separator layer portion 910 in recess 918, as described above. A removal process can then be used to form the electrolyte/separator layer portion 910. For example, an etching technique can be used, which can include an anisotropic etch or an isotropic etch using a plasma or other dry etch process. Other embodiments may make use of a wet etch technique. The result of this process is shown in FIG. 11D Once the electrolyte/separator layer portion 910 is formed, the anode layer portion 912 can be formed. Anode layer portion 912 can be formed in a variety of ways. First, a layer of material comprising the anode layer portion 912 can be deposited on substrate 900. For example, in the case of a lithium cell, a layer of lithium metal material can be deposited on substrate 900. The anode layer portion 912 can then be formed for each battery cell by a photolithography technique that defines a pattern for forming the anode layer portion 912 in recess 918 and anode contact region 916 extending out of recess 918, as described above. A removal process can then be used to form the anode layer portion 912 and anode contact region 916. For example, an etching technique can be used, which can include an anisotropic etch or an isotropic etch using a plasma or other dry etch process. Other embodiments may make use of a wet etch technique. The result of this process is shown in FIG. 11E.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A method for forming an electronic system, comprising:
   providing a first substrate having a first surface and a second substrate having a second surface opposed from said first surface;
   first disposing a plurality of projections on each of said first surface and said second surface in laterally spaced areas along a lateral direction that is parallel to the first and second surfaces;
   second disposing a plurality of battery cell layers respectively on each of said plurality of projection so as to form a first plurality of laterally spaced battery cells on said first surface having a first periodic pattern that is laterally spatially offset from a second plurality of laterally spaced battery cells disposed on said second surface and having a second periodic pattern;
   aligning said first and said second substrates; and
   selecting said first and second periodic patterns so that, after said aligning, a portion of a cathode contact region of each of said first plurality of laterally spaced battery cells is aligned with and forms an electrical contact with an anode contact region of a respective first laterally adjacent one of said second plurality of laterally spaced battery cells, and an anode contact region of each of said first plurality of laterally spaced battery cells is aligned with and forms and electrical contact with a cathode contact region of a respective second laterally adjacent one of said second plurality of laterally spaced battery cells;
   wherein each of the plurality of projections includes transverse surfaces which extend in directions which are transverse to the lateral direction, and the plurality of battery cell layers are respectively disposed on the plurality of projections on the transverse surfaces.

2. The method of claim 1, wherein said second disposing further comprises selecting said laterally spaced areas on said first surface to form a periodic pattern that is spatially offset from a second periodic pattern of said laterally spaced areas on said second surface.

3. The method of claim 2, wherein said aligning further comprises arranging each of said laterally spaced areas on said first surface to include a first portion which is in alignment with part of an adjacent first one said laterally spaced areas on said second surface, and a second portion which is in alignment with part of an adjacent second one of said laterally spaced areas on said second surface.

4. The method of claim 1, further comprising forming at least one device on one of said first and said substrates and powered by at least one of said batteries.

5. The method of claim 1, wherein said second disposing further comprises forming at least one of said battery cell layers to have a surface that extends at least in one direction transverse to said first and second surfaces.

6. The method of claim 1, wherein said second disposing further comprises forming at least one of said battery cell layers to have a surface that extends in at least in one direction parallel to said first and second surfaces.

7. The method of claim 1, wherein said providing further comprises forming said laterally spaced areas to comprise at least one recessed surface feature formed in at least one of said first and second surfaces.

* * * * *